Patented Mar. 15, 1932

1,849,090

UNITED STATES PATENT OFFICE

CLAUDE H. HUNSAKER, OF UNIVERSITY CITY, MISSOURI

METHOD OF MAKING CELLULAR STONE LIKE MATERIAL

No Drawing. Application filed May 12, 1930. Serial No. 451,843.

An object of this invention is to produce a light-weight building stone from by-product furnace materials heretofore wasted or having but slight utility and value.

A further object is to produce a light-weight concrete aggregate of high strength and of such a nature that its ingredients may be controlled in production to result in a product having any one of a wide variety of densities and internal structures.

A still further object of the invention is to provide a light-weight building stone of substantially neutral chemical characteristics relative to the usual ingredients of concrete and with respect to ferrous metals such as those employed in building and other constructions.

A still further object is to provide an artificial stone having insulating and sound-proofing properties.

Yet another object of the invention is the production of a manufactured stone product suitable for building purposes and of internal cellular construction and high compression strength.

An additional object is attained in the production of a product capable of use as a concrete or asphaltic aggregate and which results in a marked reduction in weight, without impairment of strength, of concrete and asphaltic structures in which the aggregate is used.

Further objects and advantages of the invention will appear as the description proceeds.

Referring generally to the nature of the method of practicing the invention and the product attained thereby, the method may be said to consist in the treament of an igneous, silicious material by treating a mass thereof uniformly on its opposite sides with a liquid, such as water, while the mass is in a molten or liquid condition. The natural and resulting turbulence or ebullition of the liquid-treated igneous mass serves to distribute, with reasonable uniformity, the particles of liquid, or the vapor resulting therefrom, throughout the heated mass. The result, in the case of water-treated igneous material, is to form a great number of steam pockets so distributed throughout the mass that, upon cooling, the mass becomes homogeneously cellular and porous; its volume being greatly increased as a result of the liquid treatment, and its density correspondingly reduced. Upon freezing of the mass it may be crushed and screened to size, and employed as suggested by the objects noted above.

The value of light-weight building materials for use, say in the manufacture of concrete, has long been recognized and desired for the purpose of decreasing the dead load of building structures, bridges, columns, floors and any of the other manifold structures now formed of concrete. The various attempts to produce a light-weight aggregate have met with no appreciate success due usually to undesirable chemical characteristics existing for example, in the case of cinders, coke and the like, due to the presence of sulphur or other acid-forming substances which tend to attack and affect the strength of Portland cement and its mixtures. The sulphur and acids thereof as found in cinders, coke and the like, also tend to attack reinforcing steel and other metal members associated with concrete structures.

Other attempts at producing a light-weight material for building purposes have met with indifferent success because of a lack of one or more of the necessary physical characteristics, such as sufficient compression strength; certain products of this class having been produced by fusing clay or shale. Such products, as well as others heretofore attempted to be marketed, do not lend themselves well to use as a concrete aggregate, due to excess moisture absorption capacity which renders it difficult to mix successfully such an aggregate with cement and water.

My preference in practicing the method of the present invention and to attain a product having the noted desirable physical characteristics, is to employ blast-furnace slag which may be considered, for present purposes, as composed principally of mixtures or combinations of various silicates of calcium, aluminum and magnesium. The slag is drawn from the furnace in a molten state at temperatures ranging from 2000 to 3500 degrees F. The prevailing practice is to transport this molten slag to a dump where it is poured from the slag cars to cool and solidify. Where space restrictions compel some disposition of the slag, it is known to quench the molten mass by dumping it into a body of water which immediately granulates the substance into resulting fine particles of no inherent strength and unfit for use in concrete. It is of course, known to dispose of slag by employing it as a basis for manufacturing Portland cement, such process having, however, no bearing on the present method and product.

The method of treatment according to the present invention consists in employing a suitable receptacle or container, the size and nature of which may be determined according to the quantity, temperature and analysis of the slag to be treated. This container is preferably substantially fluid tight and of a suitable non-combustible material, and is provided at or near the bottom with means for introducing a liquid, such as water, which may be, if desired, sprayed into the container. This liquid system, by preference, extends above, or at least to the upper portion of the container devoted to receiving the mass of slag to be treated, the liquid system further consisting, say of a line of pipe extending about the perimeter of the slag container, the pipe being provided at suitable, preferably regular, intervals with spray nozzles. The water supply line leading to the spray nozzles and container is provided with a control valve with which there may be associated a meter, an automatic scale arranged for delivering a definite weight or volume of water, or any other suitable means for controlling the amount of water applied to the slag, and for controlling, at least approximately, the rate of application of the water or other liquid.

For convenience of delivery of the slag to the treating container, such container is preferably disposed alongside the slag track and below such track, so that delivery may be made into the container, by gravity. Such a treating plant is conveniently disposed not too remotely from the source of slag, so that the cooling interval before treatment, is not too great.

The slag container may be provided with a grating structure or any suitable support for the slag mass, and there may be associated with such structure elevating or lifting means for removing the slag from the container after it is cooled sufficiently. In the absence of a grating or supporting structure, the treated slag may be removed from the container as by a clam shell bucket or any of the usual lifting and loading apparatus employed for handling materials of this class.

In operation, after the slag has been dumped or poured into the treating container, water or steam is applied by means of the spray or nozzles to the mass of slag under treatment, as uniformly as possible around all sides of the mass. This spraying process is, by preference, continued at least three minutes and preferably not over five minutes, depending somewhat upon the initial temperature of the slag and upon the density of the aggregate or material to be produced. Experience, however, indicates that factors other than the time of application of the water, should be employed to vary the density as hereinafter described. During the application of the water or steam, the particles impinging upon the surface of the slag mass become enfolded, due to convection currents and ebullition within the slag mass, and are eventually distributed homogeneously throughout the mass. Immediately upon becoming embedded within the mass, the vapor particles become superheated and tend to expand, thus forming a plurality of closely disposed cells or pockets within the mass. Following the few minutes period of water treatment, the mass is allowed to cool. It is of great importance that the rate of cooling be slow, since if cooled too rapidly or suddenly chilled, as is the case in the usual practice of immersing the molten slag, internal strains are developed of such a nature that the material is extremely weak and friable, and of little or no value as a building material. The length of time required for cooling depends somewhat upon the mass initially treated, but in any event the cooling mass is preferably tempered or annealed by permitting it slowly to approach the ambient temperature, allowing for this purpose about ten or twelve hours. The rate of cooling should not be accelerated by the addition of further water or liquid, due to the danger of cracking and the development of internal strains. After the mass has completely annealed and cooled, it is removed from the container, crushed, screened, and stored or loaded according to size.

The preceding description has not taken into account the facilities for producing materials of a wide range of densities and different internal cellular structures. Before considering the method and facilities of producing material of different densities it may be noted that a product of a given density may be produced to have any one of a variety of mean internal cell sizes, this variation being effected by application, say of water, in the form of smaller or larger liquid particles. The liquid particle size is controlled by adjusting the sprays or pipe openings delivering moisture to the slag mass. Other factors being equal, the larger the mean cell size desired, the smaller the number of cells existing in a given volume or mass of the resulting product. When the moisture is applied in the form of steam or very small liquid particles, the cells are practically of infinite number and of small size. By the addition of water in the form of a coarser spray, the cell size may be increased to a much greater average diameter. It will be understood that this variation in cell size and hence of internal structure is effected irrespective of variation of other factors hereinafter described for controlling the density of the resulting product.

The following description of the method of controlling the density of the resulting material may be prefaced by the statement that the temperature and analysis of the slag to be treated usually varies according to the kind and location of the furnace constituting its source, but for a given location and furnace, usually varies but little from day to day. Hence for practical purposes at least the temperature of slag from a given installation may be considered as a constant which is originally determined. For purposes of illustration it may be assumed, as representing an average temperature, that the slag is delivered at 3000 degrees F.

According to the present principles the product resulting from the controlled water-treatment of slag may be varied in density from approximately 2200 pounds per cubic yard, which represents an average figure for an untreated or non-cellular product, to a minimum weight, say of 500 pounds per cubic yard, under which conditions the volume of slag is increased about four times or conversely expressed, its density reduced to about one-fourth of the original figure.

As best illustrating the manner of controlling the density of the finished material and of the various effects attained by varying and different factors in the process, the factors, conditions and their respective influences on the product, may be separately discussed.

The effect on the product, of variations in temperature of the slag to be treated, has been found, by experiment, to indicate that, to produce a given product, the mass of water to be added to a given mass of slag under treatment, is proportionate to the temperature of the mass to be treated. If it be assumed that the slag is delivered to the treating container at 3000 degrees F., and weighing initially 2200 pounds per cubic yard, an addition of 80 pounds or approximately ten gallons of water or its equivalent in water vapor particles or steam, for each cubic yard of slag to be treated, will serve to reduce the gravity of the slag one-half, or say to a weight of 1100 pounds per cubic yard. Considering now the effect of variation of the initial temperature of the slag, the amount of water to be added should be proportionately increased, for example, one-sixth, if the initial temperature of the slag be 3500 degrees instead of 3000. Conversely, if the initial temperature of the slag be 2500 degrees instead of 3000, only five-sixths of the weight or volume of water need be added to produce the same finished product. It will appear from the preceding discussion that, assuming the temperature of the slag and other conditions to be constant, varying the amount of water added, through the meter, automatic scale or other arrangement, will serve to vary the density of the finished product in inverse proportion to the mass of water added. This statement however holds true only within certain limits. While increasing the quantity of moisture within such limits does operate to decrease density and increase expansion of the mass, such limits must not be exceeded because of the danger of developing internal strains in the mass and impairing the physical qualities of the finished material. For practical purpose it may, however, be considered that the density varies inversely with the mass of liquid added. For example, assuming the temperature of the slag under treatment to be 3000 degrees F., other factors being equal, if it is desired to produce a product of such density that a cubic yard thereof will weigh 1650 pounds, five gallons or about forty pounds of water per cubic yard of slag will effect the desired result. If, however, it is desired to decrease the density of the product to 550 pounds per cubic yard, 120 pounds of water in any suitable form, added to each cubic yard of slag under treatment, will produce a product of such a density as to weigh substantially 550 pounds per cubic yard.

The effect of varying the temperature of the water need not be considered at this writing, since water from most sources varies only between narrow temperature limits and this slight variation is without perceptible effect in the product obtained.

While the method or process of treating the slag has been described by making reference to a particular method of control of the weight or volume of moisture added per unit weight of slag under treatment, unless the weight of slag under treatment, unless the density is to be kept closely within desired limits, a desirable product may be arrived at by merely observing the mass as it is treated with water. The slag body under treatment, as the steam therein expands, tends to increase the volume of the mass and proportionately to decrease its density. The initial volume of slag may, for example, be gauged on the wall of the container, and as treatment progresses when the slag mass has obtained, say double its initial volume, it will have attained, of course, substantially one-half of its original density.

The preceding specific description has intentionally been confined to describing the control of the process for attaining products of certain definite densities. It will be understood, however, that the amounts of water or other factors given, may be modified by interpolation, so as to enable readily determining the treatment to be given for producing a product or material of any desired density between limits, say of 500 and 2200 pounds per cubic yard, assuming blast-furnace slag to be the material under treatment.

After crushing and sizing the resulting material, it may be employed either alone for any of the usual construction purposes, or considered as a concrete aggregate, it may be mixed with water and cement with or without the addition of sand to produce a concrete of a strength requisite for any ordinary building purpose, but substantially lighter than concrete employing existing aggregates.

While the method and product of the present invention has been described in detail as applied to blast furnace slag, it will be understood that its application is not so limited as to source of raw material, but may be applied to other igneous or silicious material capable of water treatment in its molten state to produce a porous or cellular mass of substantial strength.

I claim as my invention:

1. A step in the described method of making a cellular stone-like material by applying water particles to a predetermined mass of molten igneous material, which consists in regulating the size of the fluid particles to control the internal structure of the product.

2. The herein described method of making a cellular stone-like material, which consists in applying a predetermined weight of water to a given mass of molten igneous material, in controlling the density of the product by varying the amount of water applied to the molten material, and in controlling the strength of the finished material by continuing the addition of water for only a period of time predetermined according to the initial mass of molten material, and in controlling the internal texture of the material by varying the particle size of the water applied to the material.

3. The herein described method of treating a molten silicious material to alter its original density by formation of internal cells which consists in adding a vapor-forming liquid in amount not exceeding a predetermined maximum, to a predetermined molten mass of such material, in controlling the average size of resulting cells, through control of the particle size of the added liquid, and permitting the distribution and retention of the vapor of such liquid substantially through the original mass of material as altered, and in slowly cooling the treated material.

4. The herein described method of reducing the density of a fused silicious material by rendering it cellular, which consists in applying particles of water substantially evenly through a fused mass of the material, and in a quantity definitely restricted according to the mass of fused material, in controlling the average size of the resultant cells, independently of its density, by varying the size of said particles, and in tempering the treated material, prior to any movement following its treatment.

5. The herein described method of increasing the volume of a given mass of fused silicious material, which consists in utilizing a predetermined weight of steam not exceeding a maximum low percentage of the weight of slag under treatment, to form a cellular internal structure substantially throughout the mass of material and in slowly cooling the steam-treated material prior to any further movement thereof.

6. The herein described method of treating furnace slag to produce a cellular stone-like material, which consists in applying a predetermined, measured quantity of water uniformly through a predetermined mass of slag, and homogeneously increasing the volume of the slag mass while the slag is in fused condition, in applying such quantity of water within a predetermined period of time, whereby to control the rate of application of the water, and in slowly cooling, or annealing, the slag mass after addition of said quantity of water, and before moving the mass from its place of treatment.

7. The herein described method of treating blast furnace slag while in fused condition to produce a cellular material which consists in applying a quantity of water to a predetermined mass of slag and causing its distribution through the slag mass whereby to increase the volume of the initial slag mass, in predetermining the quantity of water utilized according to the mass and temperature of the slag under treatment, and in controlling the internal structure of the treated slag mass by regulating the size of particles of the added water.

8. The herein described method of treating blast furnace slag to reduce its density, which consists in isolating a predetermined mass of the slag, in applying a predetermined quantity of water through the slag mass, while the slag is in fused condition whereby to vary the volume of all parts of the slag mass, in proportioning the total quantity of water applied according to the mass of slag under treatment, and according to the density of the product desired, and in adding such quantity of water over and within a predetermined period of time.

9. The herein described method of treating blast furnace slag to produce a cellular stone-like material from an isolated, predetermined mass of the slag while in fused condition, in uniformly treating all of said predetermined slag mass by applying a quantity of water to the slag while in fused condition, in determining the quantity of water applied to the slag according to the initial temperature and mass of the slag, and according to the density of the product desired, in applying the predetermined quantity of water, within and over a period of time predetermined to avoid formation of any substantial part of the end products under internal strains, in applying a portion of the predetermined quantity of water, in the form of finely divided particles, and in slowly cooling the mass of slag after treatment.

CLAUDE H. HUNSAKER.